(12) United States Patent
Maruyama (10) Patent No.: US 12,050,325 B2
(45) Date of Patent: Jul. 30, 2024

(54) WEARABLE DISPLAY DEVICE

(71) Applicant: SEIKO EPSON CORPORATION, Tokyo (JP)

(72) Inventor: Keishi Maruyama, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 132 days.

(21) Appl. No.: 17/853,931

(22) Filed: Jun. 30, 2022

(65) Prior Publication Data

US 2023/0004011 A1   Jan. 5, 2023

(30) Foreign Application Priority Data

Jul. 1, 2021 (JP) ................... 2021-110104

(51) Int. Cl.
*G02B 27/01* (2006.01)
*H04N 7/18* (2006.01)
*H04N 23/53* (2023.01)
*H04N 23/57* (2023.01)

(52) U.S. Cl.
CPC ..... *G02B 27/0176* (2013.01); *G02B 27/0172* (2013.01); *H04N 7/18* (2013.01); *H04N 23/53* (2023.01); *H04N 23/57* (2023.01); *G02B 2027/0138* (2013.01)

(58) Field of Classification Search
CPC ............ G02B 27/0176; G02B 27/0172; G02B 2027/0138; H04N 7/18; H04N 23/53; H04N 23/57
See application file for complete search history.

(56) References Cited

U.S. PATENT DOCUMENTS

2016/0062457 A1   3/2016   Kobayashi
2020/0333578 A1*  10/2020  Capelli .............. G02B 27/0176

FOREIGN PATENT DOCUMENTS

JP    2008085854 A  *  4/2008
JP    2016-212320       12/2016

\* cited by examiner

*Primary Examiner* — Ahmed A Berhan
(74) *Attorney, Agent, or Firm* — JCIPRNET (57) ABSTRACT

A wearable display device includes a mounting unit, an image display unit that displays an image, a frame that supports the image display unit, an imaging unit that is supported by the frame and that captures an external scene, a coupling unit that connects the frame and the mounting unit such that a position of the image display unit with respect to the mounting unit is changeable in a first direction, and an image acquisition unit that acquires a first image of the external scene from a range on one side in the first direction in an imaging range of the imaging unit when the position of the image display unit with respect to the mounting unit is changed from the one side to another side in the first direction.

4 Claims, 6 Drawing Sheets

WEARABLE DISPLAY DEVICE

The present application is based on, and claims priority from JP Application Serial Number 2021-110104, filed Jul. 1, 2021, the disclosure of which is hereby incorporated by reference herein in its entirety.

BACKGROUND

1. Technical Field

The present disclosure relates to a wearable display device.

2. Related Art

Previously, a head mounted display (HMD) is known as a wearable display device that is detachably worn by a user on a head and directly projects an image displayed on an image display unit onto the eyes of the user. The HMD is used in a wide variety of applications, for example, as a display device for remote assistance of an industrial device, a medical device, etc., in addition to viewing content video such as a DVD or a video.

For example, in a case where an instruction is received from a support person at a remote place, a worker wears an HMD including a camera, and images an image of an external scene including a target subject with the camera. When the external scene imaged by the camera is displayed on a monitor, etc., on the support person side, assistance from a remote place is performed in which an appropriate instruction is provided from the support person to the worker by voice or video.

In a case where the worker performs actual work, when the image display unit is disposed in front of the eye, a field of view of the worker is blocked and efficiency of the work is reduced. Therefore, it is desirable to move the image display unit to a position away from the eyes of the worker. For example, JP-A-2016-212320 discloses an HMD that can be moved from a position corresponding to the eyes of a worker to a position outside the field of view by flipping up an image display unit while the HMD is worn.

However, in the HMD disclosed in JP-A-2016-212320, the camera is provided at the image display unit, and thus when the image display unit is flipped up, the camera moves together with the image display unit. At this time, since the range of the external scene imaged by the camera changes before and after the image display unit is flipped up, the subject of the work is deviated from the imaging range of the camera. Therefore, there is a problem that the external scene imaged after the image display unit is flipped up is not intended by a support person at a remote place.

SUMMARY

In order to solve the problem described above, according to a first aspect of the present disclosure, there is provided a wearable display device of the present disclosure includes a mounting unit, an image display unit that displays an image, a frame that supports the image display unit, an imaging unit that is supported by the frame and that captures an external scene, a coupling unit that connects the frame and the mounting unit such that a position of the image display unit with respect to the mounting unit is changeable in a first direction, and an image acquisition unit that acquires a first image of the external scene from a range on one side in the first direction in the imaging range of the imaging unit when the position of the image display unit with respect to the mounting unit is changed from the one side to another side in the first direction.

DESCRIPTION OF EXEMPLARY EMBODIMENTS

An exemplary embodiment of the present disclosure will be described in detail below with reference to the accompanying drawings.

Note that, in the drawings used for the following descriptions, characteristic portions are expanded for convenience to make characteristics easily comprehensible in some cases, thus dimension ratios among respective constituent elements or the like are not necessarily the same as actual dimension ratios.

First Exemplary Embodiment

A wearable display device according to the present exemplary embodiment is an example of a head mounted display used by being worn on a head. In the description below, the term "Head Mounted Display" is abbreviated as "HMD". The HMD according to the present exemplary embodiment is used for operation on an industrial device or a medical device, for example, and is worn by a worker on a head receiving an instruction from a support person at a remote place.

In each of the following drawings, an XYZ orthogonal coordinate system is configured to describe a configuration and positional relationship of each member. In the following description, unless otherwise specified, the terms "front", "rear", "left", "right", "up", and "down" refer to the respective directions as viewed from the worker wearing the HMD. For example, the X-axis corresponds to an axis along the front-rear direction of the worker, the Y-axis corresponds to an axis along the left-right direction of the worker, and the Z-axis corresponds to an axis along the vertical direction of the worker. In the present specification, a +X side corresponds to a front side of the worker, a −X side corresponds to a rear side of the worker, a +Y side corresponds to a right side of the worker, a −Y side corresponds to a left side of the worker, a +Z side corresponds to an upper side of the worker, and a −Z side corresponds to a lower side of the worker, respectively. Also, hereinafter, the directions are referred to as the front-rear direction X, the left-right direction Y, and the vertical direction Z. In this specification, the front-rear direction X corresponds to a "third direction", the left-right direction Y corresponds to a "second direction", and the vertical direction Z corresponds to a "first direction".

Figure 1A:
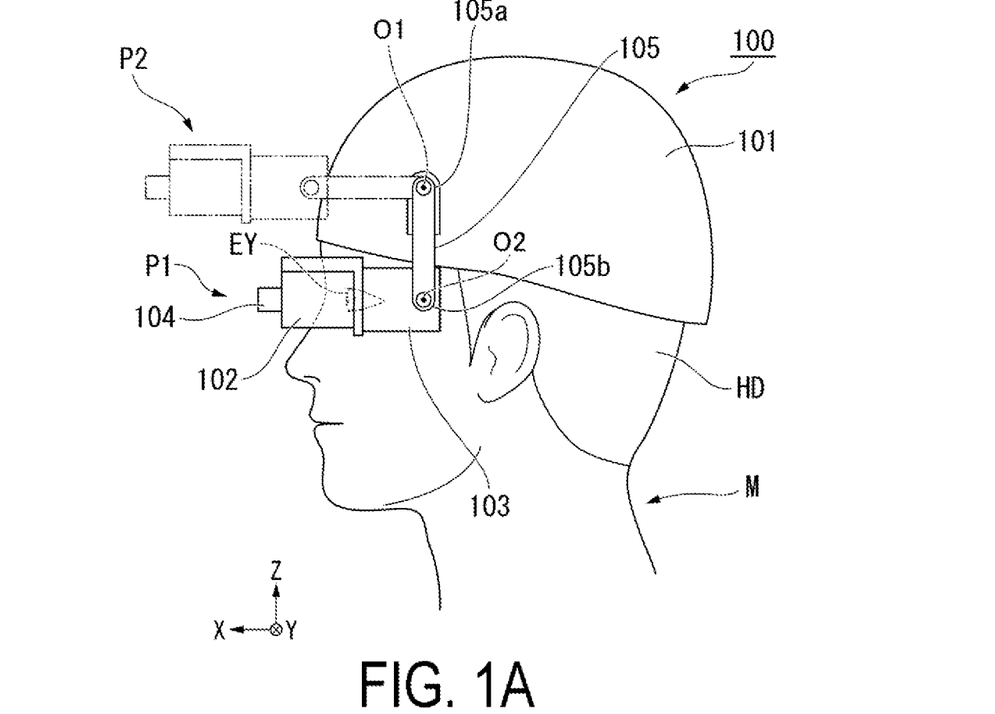
FIG. 1A is a diagram illustrating a usage state of an HMD of a first exemplary embodiment.
Figure 1B:
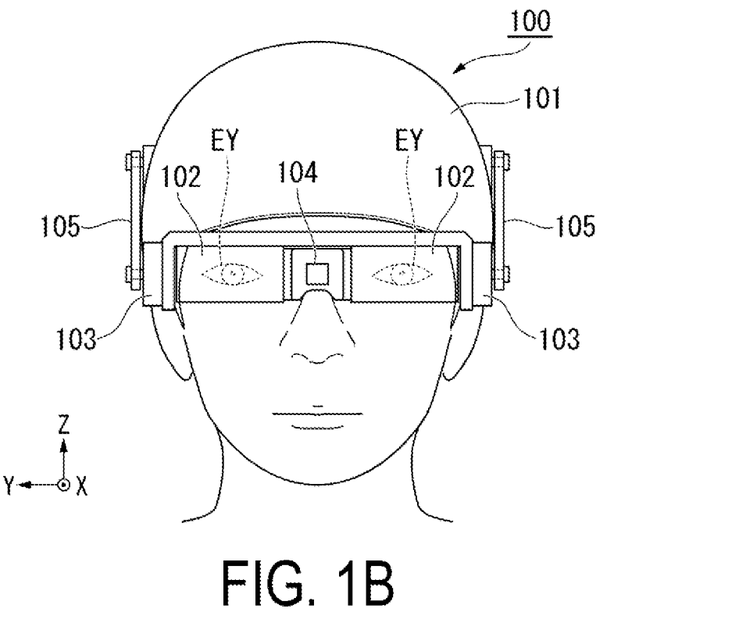
FIG. 1B is a front view illustrating a configuration of a main part of the HMD.

FIG. 1A is a diagram illustrating a usage state of an HMD 100 of the present exemplary embodiment. FIG. 1B is a front view illustrating a configuration of a main part of the HMD 100.

As illustrated in FIG. 1A, the HMD 100 according to the present exemplary embodiment is used in a state of being worn on a head HD of a worker M. The worker M visually recognizes an image displayed at an image display unit 102.

As illustrated in FIGS. 1A and 1B, the HMD 100 of the present exemplary embodiment includes a mounting unit 101, the image display unit 102, a frame 103, an imaging unit 104, and a coupling unit 105.

The mounting unit 101 is a member for mounting the HMD 100 on the head HD of the worker M. The mounting unit 101 of the present exemplary embodiment has a helmet shape covering the entire head HD of the worker M, but the shape of the mounting unit 101 is not limited thereto. For example, it can be a hair band shape worn on the head HD of the worker M. In this case, the hair band shape is configured by a mounting base portion provided on the +X side of the head HD of the worker M and a belt portion linked to the mounting base portion.

The image display unit 102 displays images corresponding to both eyes EY of the worker M. The image displayed at the image display unit 102 is, for example, an image related to a work transmitted from a support person (hereinafter, simply referred to as an operator) at a remote place. The image displayed at the image display unit 102 is, for example, an image transmitted from a work support person (hereinafter, simply referred to as an operator) at a remote place. The worker M can perform smooth operation by being assisted by the operator with reference to the image displayed at the image display unit 102.

Note that the image display unit 102 may be a see-through type (transmission type), or may be non-transmission type. The HMD 100 of the present exemplary embodiment includes a see-through type image display unit 102, and the worker M can visually recognize an external scene via the image display unit 102 together with the image displayed at the image display unit 102.

The frame 103 supports the image display unit 102 and the imaging unit 104. The imaging unit 104 includes, for example, a small imaging element such as a CCD camera. The imaging unit 104 may be configured by assembling a plurality of imaging elements. In this case, an imaging range in which the imaging unit 104 captures the external scene can be easily expanded.

The coupling unit 105 is a member that connects the frame 103 and the mounting unit 101 such that the position of the image display unit 102 with respect to the mounting unit 101 in the vertical direction Z is changeable. The coupling unit 105 rotates about a rotational axis extending in the left-right direction Y orthogonal to the vertical direction Z, and thus changes the position of the image display unit 102 with respect to the mounting unit 101 in the vertical direction Z. In the present exemplary embodiment, as illustrated in FIG. 1B, the coupling units 105 are provided on both sides of the frame 103 in the left-right direction Y. Note that the number and mounting positions of the coupling units 105 are not limited thereto.

In the present exemplary embodiment, the coupling unit 105 includes a first linkage portion 105a linked to the mounting unit 101 and a second linkage portion 105b linked to the frame 103. The first linkage portion 105a is rotatably linked to the mounting unit 101 about a first rotational shaft O1 extending in the left-right direction Y. The second linkage portion 105b is rotatably linked to the frame 103 about a second rotational shaft O2 extending in the left-right direction Y.

The coupling unit 105 changes the position of the image display unit 102 with respect to the mounting unit 101, between a first position P1 located on the lower side (−Z side) which is one side in the vertical direction Z and a second position P2 located on the upper side (+Z side) which is the other side in the vertical direction Z. In the case of the present exemplary embodiment, the operation of rotating the coupling unit 105 is performed manually, but the operation of rotating the coupling unit 105 may be performed by using a driving unit (not illustrated). The driving unit is configured with a motor, for example.

In the present exemplary embodiment, as illustrated in FIG. 1A, the image display unit 102 is disposed in front of the eye EY of the worker M when the image display unit 102 is located at the first position P1 with respect to the mounting unit 101. Additionally, the image display unit 102 is disposed at a position that is retracted upward from the eye EY of the worker M when the image display unit 102 is located at the second position P2 with respect to the mounting unit 101.

By changing the position of the image display unit 102 from the first position P1 to the second position P2, the HMD 100 of the present exemplary embodiment can be easily switched between a state in which the image display unit 102 is disposed in front of the eye EY of the worker M and a state in which the image display unit 102 is moved upward from the front of the eye EY of the worker M (a state indicated by a two dot chain line). Hereinafter, a state in which the position the image display unit 102 is changed from the first position P1 to the second position P2 by being flipped up is referred to as "flip-up".

For example, when the worker M lifts the frame 103 diagonally upward, the first linkage portion 105a rotates to the one side (upper side) about the first rotational shaft O1, so that the coupling unit 105 moves upward. At this time, the frame 103 linked to the second linkage portion 105b of the coupling unit 105 is rotated downward about the second rotational shaft O2. Then, the coupling unit 105 flips up the image display unit 102 until it reaches a position retracted from the both eyes EY of the worker M.

In the HMD 100 according to the present exemplary embodiment, in a state in which the image display unit 102 is flip-up, a fixing mechanism is employed that fixes the positions of the mounting unit 101 and the first linkage portion 105a and the positions of the frame 103 and the second linkage portion 105b. In this manner, when the image display unit 102 is flip-up, the image display unit 102 is stably supported by the fixing mechanism. Accordingly, it is possible to suppress the position of the image display unit 102 from being shifted, and the work of the worker M is not disturbed.

Figure 2:
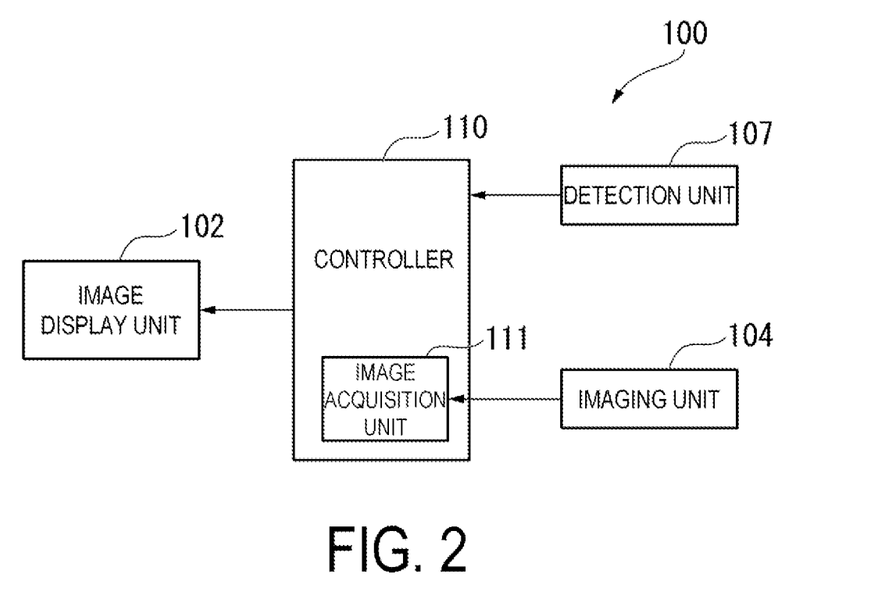
FIG. 2 is a block diagram illustrating an electrical configuration of the HMD.

FIG. 2 is a block diagram illustrating an electrical configuration of the HMD 100 of the present exemplary embodiment.

As illustrated in FIG. 2, the HMD 100 of the present exemplary embodiment further includes a controller 110 that controls operation of each configuration, and a detection unit 107. The controller 110 is electrically coupled to the image display unit 102, the imaging unit 104, and the detection unit 107. The controller 110 of the present exemplary embodiment functions as a control device for controlling the drive of the entire HMD 100.

The detection unit 107 detects a change amount of the position of the imaging unit 104 caused by the change in the position of the image display unit 102 with respect to the mounting unit 101. In the case of this exemplary embodiment, for example, a gyro sensor is used as the detection unit 107.

The detection unit 107 is provided, for example, in the coupling unit 105. In a case where the position of the image display unit 102 with respect to the mounting unit 101 is changed, the detection unit 107 detects a rotation angle of the coupling unit 105 based on a position before the position of the image display unit 102 is changed and a position after the position of the image display unit 102 is changed. The detection unit 107 detects the change amount of the position of the imaging unit 104 provided at the frame 103 by detecting the rotation angle of the coupling unit 105. That is, the detection unit 107 detects a change in the position of the imaging unit 104 caused by the flip-up. The detection unit 107 transmits a detection result to an image acquisition unit 111 of the controller 110.

The imaging unit 104 captures the external scene including a subject to work by the worker M. The imaging unit 104 transmits data of the imaged external scene to the controller 110. The imaging unit 104 of the present exemplary embodiment has a focus function for adjusting a focus to a subject to work by the worker M. The imaging unit 104 also has a zoom function that allows the focal length to be variable in accordance with the distance to the subject.

The controller 110 transmits an image of the external scene imaged by the imaging unit 104 to a host device (not illustrated), for example, by radio. The host device is a device installed on the operator side on the remote place, and causes the display device to display an image of the external scene imaged by the imaging unit 104.

In this manner, the operator visually recognizes the image of the external scene imaged by the imaging unit 104, and accurately grasps the subject to work by the worker M while being in a remote place, so that the operator can provide an appropriate work instruction to the worker M.

Incidentally, it is assumed that the worker M flips up the image display unit 102 in order to secure a field of view during work. By flipping up the image display unit 102, the frame 103 that supports the image display unit 102 is also flipped up upward. Therefore, when the image display unit 102 is flipped up, the frame 103 is also flipped up, so that the position of the imaging unit 104 supported by the frame 103 changes upward as illustrated in FIG. 1A.

When the position of the imaging unit 104 changes, the positional relationship between the imaging unit 104 and the target subject changes, and thus the external scene imaged by the imaging unit 104 may also change. When the external scene imaged by the imaging unit 104 changes in this manner, the image of the external scene displayed at the display device on the operator side also changes, so the operator may not provide an appropriate instruction for the worker M.

In contrast, in the HMD 100 of the present exemplary embodiment, the image data captured by the imaging unit 104 is transmitted to the image acquisition unit 111 of the controller 110.

The image acquisition unit 111 acquires a captured image from a portion in the imaging range of the imaging unit 104 based on the position of the image display unit 102 with respect to the mounting unit 101. That is, the HMD 100 of the present exemplary embodiment acquires, as a captured image, a portion selected from the imaging range, not the entire imaging range by the imaging unit 104 in the image acquisition unit 111.

In the HMD 100 of the present exemplary embodiment, at least an imaging unit 104 having a wide angle of view in the vertical direction Z is used. Here, having a wide angle of view in the vertical direction Z means a state in which the imaging range of the imaging unit 104 before the flip-up and the imaging range of the imaging unit 104 after the flip-up at least partially overlap each other in the vertical direction Z when the position of the imaging unit 104 changes before and after the flip-up.

Hereinafter, a transmission flow of the captured image from the controller 110 to the host device is described. Hereinafter, a case in which the position of the image display unit 102 is flipped up from the first position P1 to the second position P2 will be described as an example.

Figure 3:
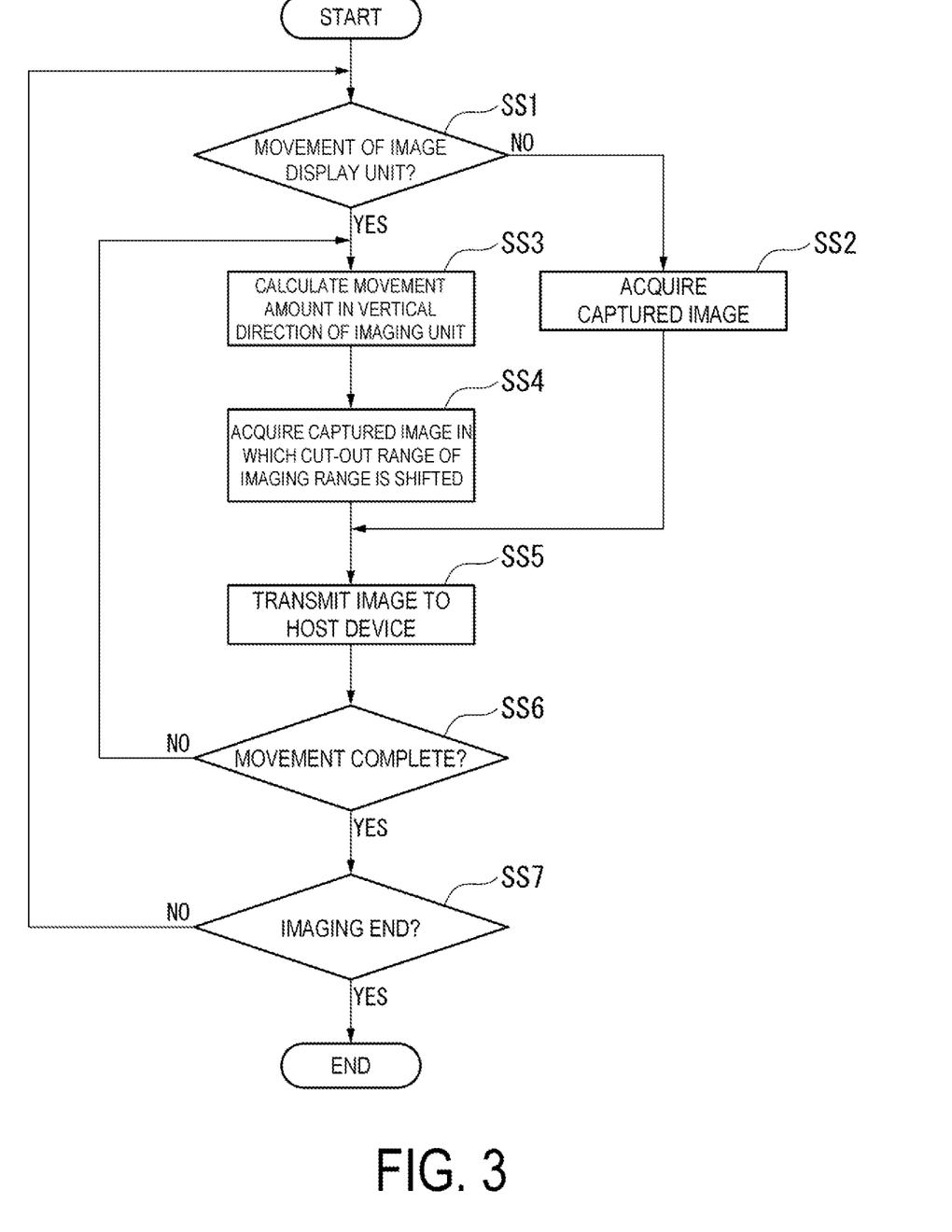
FIG. 3 is a diagram illustrating a transmission flow of a captured image from a controller to a host device.

FIG. 3 is a diagram illustrating the transmission flow of the captured image from the controller 110 to the host device.

Figure 4:
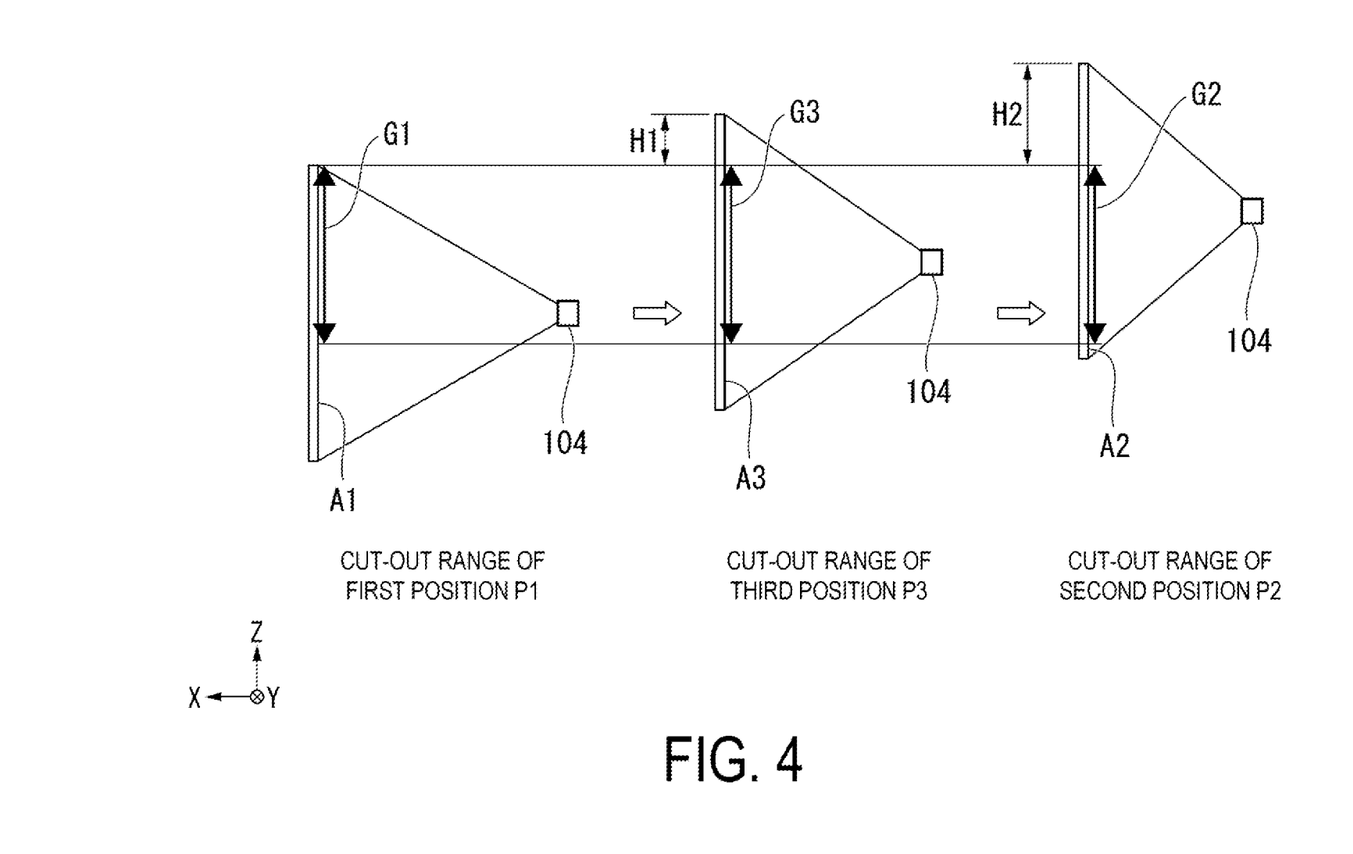
FIG. 4 is a side view illustrating a change in an imaging range before and after flip-up.
Figure 5:
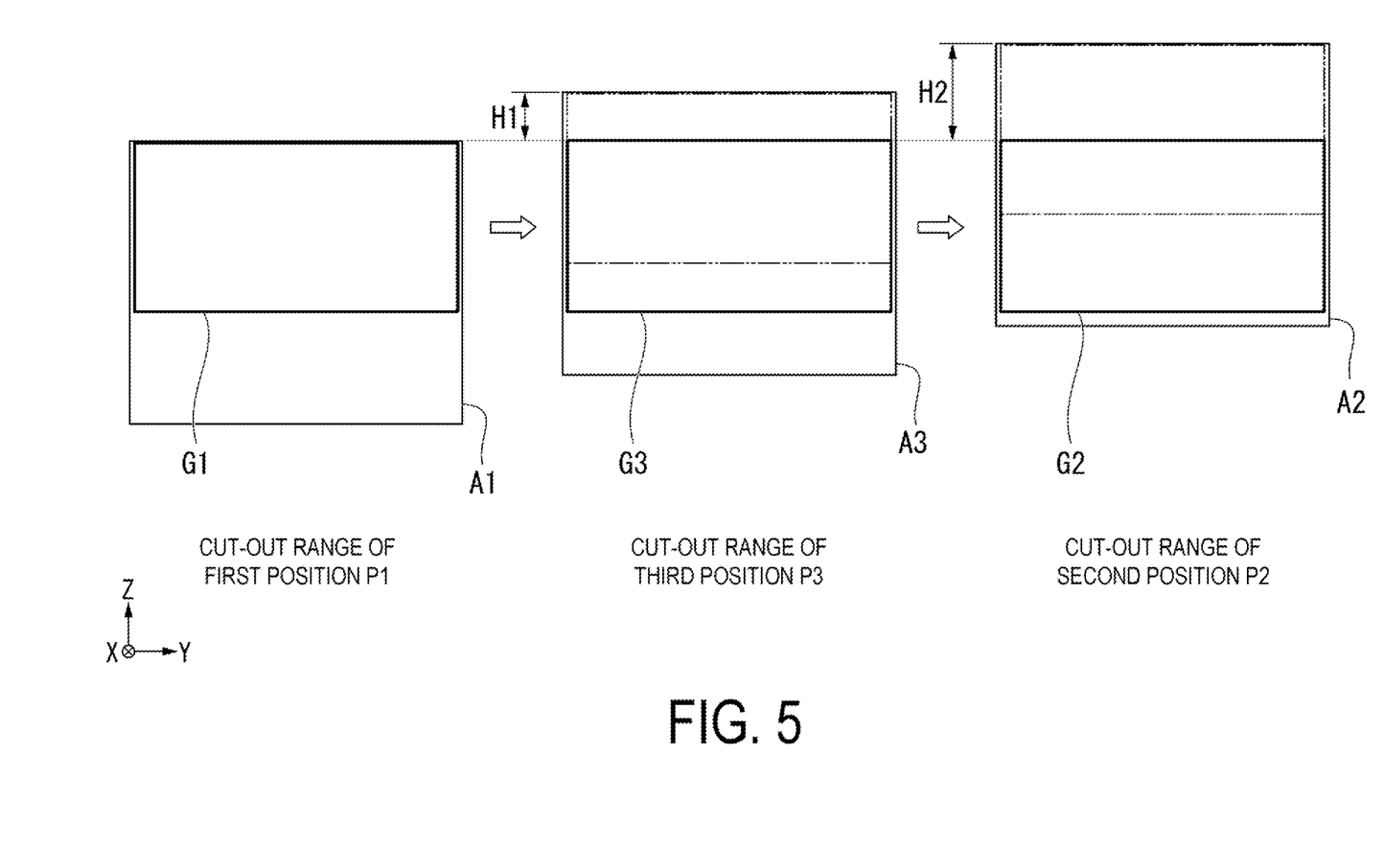
FIG. 5 is a front view illustrating a change in the imaging range before and after the flip-up.

FIG. 4 is a side view illustrating a change in the imaging range of the imaging unit 104 before and after the flip-up. FIG. 5 is a front view illustrating a change in the imaging range of the imaging unit 104 before and after the flip-up. In FIGS. 4 and 5, in order to simplify the description, it is assumed that the inclination of the imaging unit 104 does not change before and after the flip-up.

In FIGS. 4 and 5, an imaging range of the imaging unit 104 when the image display unit 102 is located at the first position P1 (before the flip-up) is referred to as a first imaging range A1, an imaging range of the imaging unit 104 when the image display unit 102 is located at the second position P2 (after the flip-up) is referred to as a second imaging range A2, and an imaging range of the imaging unit 104 when the image display unit 102 is located at a third position P3 (during the flip-up) between the first position P1 and the second position P2 is referred to as a third imaging range A3.

The controller 110 starts an image acquisition flow by the image acquisition unit 111 at a timing when the imaging unit 104 starts imaging. First, the image acquisition unit 111 executes step SS1 illustrated in FIG. 3. In step SS1, the image acquisition unit 111 determines whether the position of the image display unit 102 has been changed based on the detection result transmitted from the detection unit 107.

When the image acquisition unit 111 does not detect the movement of the image display unit 102 based on the detection result of the detection unit 107 (step SS1: NO), the process proceeds to step SS2.

In step SS2, when the image display unit 102 is located at the first position P1, as illustrated in FIGS. 4 and 5, the image acquisition unit 111 acquires a first captured image G1 by cutting out a portion on the second position P2 side (upper side: +Z side) in the first imaging range A1 of the imaging unit 104, and proceeds to step SS5.

Note that in FIG. 5, a case in which the entire left-right direction Y is cut out from the first imaging range A1 is illustrated, but the size of the cut-out range from the first imaging range A1, that is, the size of the first captured image G1 can be changed as appropriate depending on the application. For example, in a case where the size of the cut-out range is determined based on the viewing angle of the worker M, the ratio may be set to 4:3 (left-right direction Y:vertical direction Z).

In step SS5, the controller 110 transmits the first captured image G1 acquired by the image acquisition unit 111 to the host device. The host device displays the first captured image G1 of the imaging unit 104. At this time, the operator can support the work of the worker M by visually recognizing the first captured image G1 by the imaging unit 104.

On the other hand, when the start of the flip-up operation is detected based on the detection result of the detection unit 107 (step SS1: YES), the image acquisition unit 111 proceeds to step SS3.

At the time of the flip-up operation, in the HMD 100 of the present exemplary embodiment, the imaging unit 104 moves in the vertical direction Z together with the image display unit 102 and the frame 103 as the coupling unit 105 rotates. Therefore, the rotation angle of the coupling unit 105 and the movement amount of the imaging unit 104 in the vertical direction Z have a predetermined correlation. The image acquisition unit 111 of the present exemplary embodiment stores the relationship between the rotation angle of the coupling unit 105 and the vertical movement amount of the imaging unit 104 as data, which is obtained in advance by calculation.

In step SS3, the image acquisition unit 111 calculates the movement amount of the imaging unit 104 in the vertical direction Z by comparing the rotation angle of the coupling unit 105 acquired from the detection result of the detection unit 107 with the above-described storage data.

As illustrated in FIGS. 4 and 5, when the image display unit 102 moves from the first position P1 to the third position P3, the movement amount of the imaging unit 104 in the vertical direction Z is assumed to be H1.

Here, the movement amount in the vertical direction Z of the imaging unit 104 and the movement amount in the imaging range of the imaging unit 104 are equivalent. That is, the third imaging range A3 by the imaging unit 104 is in a range moved by H1 to the upper side (+Z side) compared to the first imaging range A1.

Here, when a portion of the third imaging range A3 is cut out as a captured image, it is assumed that the captured image is cut out from a position similar to that of the first captured image G1 with respect to the first imaging range A1 before the flip-up. As described above, since the third imaging range A3 is shifted by H1 on the upper side of the first imaging range A1, the position of the captured image cut out from the same range as the first captured image G1 is shifted in the vertical direction Z by H1 with respect to the first captured image G1. Therefore, the captured image does not coincide with the first captured image G1 and becomes a different image.

On the other hand, in step SS4, the image acquisition unit 111 acquires the captured image by cutting out a portion of the first position P1 (lower side: −Z side) in the imaging range of the imaging unit 104. Specifically, the image acquisition unit 111 cuts out a range shifted to the lower side by H1 in the third imaging range A3 as the third captured image G3, and proceeds to step SS5. Since the position in the vertical direction Z of the third captured image G3 acquired in this manner coincides with that of the first captured image G1 acquired before the flip-up, the third captured image G3 becomes an image equivalent to the first captured image G1.

In step SS5, the controller 110 transmits the third captured image G3 acquired by the image acquisition unit 111 to the host device. The host device displays the third captured image G3 of the imaging unit 104. At this time, the operator can support the work of the worker M in the same manner by visually recognizing the third captured image G3 equivalent to the first captured image G1 by the imaging unit 104.

Subsequently, after transmitting the captured image to the host device, the controller 110 proceeds to step SS6. In step SS6, the controller 110 repeats step SS5 from step SS3 until the movement of the image display unit 102 is completed (step SS6: NO).

Here, when the image display unit 102 moves to the second position P2 (when the flip-up operation is completed), the movement amount of the imaging unit 104 in the vertical direction Z is assumed to be H2. At this time, the imaging range of the imaging unit 104 changes to the second imaging range A2 by moving the first imaging range A1 to the upper side (+Z side) by H2.

The image acquisition unit 111 cuts out a range shifted to the lower side by H2 in the second imaging range A2 as the second captured image G2. Since the position in the vertical direction Z of the second captured image G2 acquired in this manner coincides with that of the first captured image G1 acquired before the flip-up, the second captured image G2 becomes an image equivalent to the first captured image G1.

Note that in the HMD 100 of the present exemplary embodiment, as illustrated in FIG. 1A, the position of the imaging unit 104 in the front-rear direction X is changed before and after the flip-up. In contrast, the imaging unit 104 of the present exemplary embodiment controls an exit angle with respect to the optical axis of the imaging unit 104 so as to keep the size of the imaging range constant in a case where the position in the front-rear direction X with respect to the subject to work by the worker M changes. Specifically, in the case of the present exemplary embodiment, as illustrated in FIG. 4, the imaging unit 104 can maintain the size of the imaging range constant by increasing the exit angle from the first position P1 toward the second position P2 via the third position P3.

On the other hand, when the flip-up operation is completed and the movement of the image display unit 102 is completed based on the detection result of the detection unit 107 (step SS6: YES), the controller 110 proceeds to step SS7. When the imaging unit 104 continues imaging (step SS7: NO), the controller 110 returns to step SS1 and repeats the above-described flow.

For example, in a case where the imaging of the imaging unit 104 is continued after the end of the flip-up operation, the image display unit 102 is in a state of being located at the second position P2. In this case, the image acquisition unit 111 acquires the second captured image G2 from the second imaging range A2 of the imaging unit 104 as step SS2, and proceeds to step SS5.

In a case where the imaging of the imaging unit 104 is ended (step SS7: YES), the controller 110 ends the flow of acquiring the captured image by the image acquisition unit 111.

Note that, in the above description, the method of acquiring the captured image in the case where the position of the image display unit 102 is changed from the first position P1 to the second position P2 has been described as an example, but the captured image can also be acquired in the same manner in the case where the position of the image display unit 102 is changed from the second position P2 to the first position P1. For example, as the image display unit 102 moves to the second position P2, the third position P3, and the first position P1, the range to be cut out from the imaging range of the imaging unit 104 may be changed in the order of the second captured image G2, the third captured image G3, and the first captured image G1.

As described above, according to the HMD 100 of the present exemplary embodiment, the region to be cut out as the captured image from the imaging range of the imaging unit 104 can be shifted to the lower side by the amount by which the imaging range of the imaging unit 104 is slid to the upper side by the flip-up operation. In this manner, the HMD 100 of the present exemplary embodiment can acquire the same captured image and transmit the same captured image on the host device side even when the imaging range of the imaging unit 104 is changed by the flip-up operation.

Therefore, even when the image display unit 102 is flipped up, the operator can accurately grasp the work target of the worker M based on the image of the external scene transmitted from the HMD 100 side. In this manner, appropriate support can be continued for operation of the worker M.

Therefore, the HMD 100 of the present exemplary embodiment can provide a high-value-added head-mounted display that does not inhibit the assistance by the operator even when the position of the imaging unit 104 changes due to the flip-up.

Additionally, in the case of the present exemplary embodiment, the coupling unit 105 rotates about a rotational axis extending in the left-right direction Y, and thus changes the position of the image display unit 102 with respect to the mounting unit 101 in the vertical direction Z.

According to this configuration, it is possible to realize a configuration in which the image display unit 102 is rotated via the coupling unit 105 to easily change the position of the image display unit 102 with respect to the mounting unit 101.

Furthermore, in the case of the present exemplary embodiment, the coupling unit 105 includes the first linkage portion 105a that is rotatably linked to the mounting unit 101 about the first rotational shaft O1 extending in the left-right direction Y, and the second linkage portion 105b that is rotatably linked to the frame 103 about the second rotational shaft O2 extending in the left-right direction Y.

According to this configuration, since the image display unit 102 rotates downward about the second rotational shaft O2 with respect to the coupling unit 105, it is possible to realize a configuration in which the inclination of the imaging unit 104 is kept constant before and after the flip-up.

In the present exemplary embodiment, the coupling unit 105 can change the position of the image display unit 102 with respect to the mounting unit 101 between the first position P1 on the one side in the vertical direction Z and the second position P2 on the other side in the vertical direction Z.

According to this configuration, the coupling unit 105 moves the image display unit 102 between the first position P1 and the second position P2, so that a configuration can be realized that makes the flip-up operation easily possible.

In the present exemplary embodiment, when the image display unit 102 is located on the first position P1 side, the image acquisition unit 111 acquires the first captured image G1 by cutting out a portion on the second position P2 side in the first imaging range A1 of the imaging unit 104, and when the image display unit 102 is located on the second position P2 side, the image acquisition unit 111 acquires the second captured image G2 by cutting out a portion on the first position P1 side in the second imaging range A2 of the imaging unit 104.

According to this configuration, even in a case where the imaging unit 104 moves between the first position P1 and the second position P2 together with the image display unit 102 and the imaging range changes, it is possible to provide the HMD 100 in which the same captured image can be acquired regardless of the change in the imaging range.

In the case of the present exemplary embodiment, the detection unit 107 that detects the change amount of the position of the imaging unit 104 caused by the change in the position of the image display unit 102 with respect to the mounting unit 101 is further provided, and the image acquisition unit 111 acquires the captured image based on the detection result of the detection unit 107.

According to this configuration, the flip-up operation can be detected by the detection unit 107. In addition, it is possible to perform the inclination control of the imaging unit 104 only when the flip-up operation is detected by the detection unit 107.

Second Exemplary Embodiment

Hereinafter, an HMD according to a second exemplary embodiment of the present disclosure will be described. The difference between the present exemplary embodiment and the above exemplary embodiment is the configuration and position of the coupling unit that couples the mounting unit 101 and the frame 103, and the other configurations are common therebetween. Therefore, in the following exemplary description, members and configurations common to those of the above embodiment are denoted by the same reference numerals, and detailed description thereof will be omitted.

In the exemplary embodiment described above, a case in which the image display unit 102 moves from the first position P1 to the second position P2 by rotating in the vertical direction Z has been described as an example, but the image display unit 102 may move from the first position to the second position by sliding in the vertical direction Z.

Figure 6:
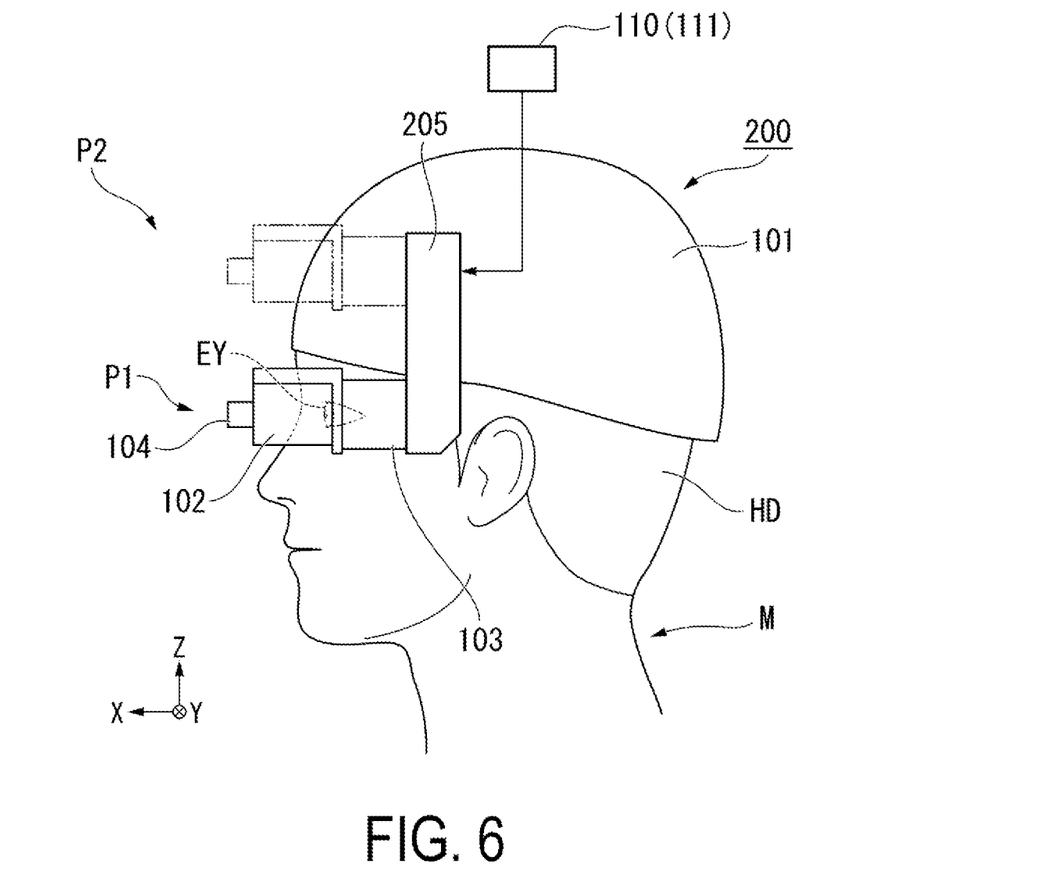
FIG. 6 is a diagram illustrating a usage state of an HMD of a second exemplary embodiment.

FIG. 6 is a diagram illustrating a usage state of an HMD of the present exemplary embodiment. In FIG. 6, a two dot chain line indicates a state in which the flip-up operation is performed in a state in which the HMD is mounted on the head HD of the worker M.

As illustrated in FIG. 6, an HMD 200 of the present exemplary embodiment includes the mounting unit 101, the image display unit 102, the frame 103, the imaging unit 104, a coupling unit 205, and the controller 110.

In the HMD 200 of the present exemplary embodiment, the coupling units 205 are provided on both sides of the mounting unit 101 in the left-right direction Y. The coupling unit 205 slidably supports both sides of the frame 103 in the left-right direction Y in the vertical direction Z. Based on such a configuration, the image display unit 102 moves from the first position P1 to the second position P2 by sliding in the vertical direction Z.

According to the HMD 200 of the present exemplary embodiment, the image acquisition unit 111 of the controller 110 can acquire a similar captured image even when the imaging range of the imaging unit 104 changes by shifting the region from which the captured image is cut out to the lower side from the imaging range of the imaging unit 104 by the amount by which the imaging range of the imaging unit 104 slides to the upper side by the flip-up operation.

Therefore, the HMD 200 of the present exemplary embodiment can provide a high-value-added head-mounted display that does not inhibit the assistance by the operator even when the position of the imaging unit 104 changes due to the flip-up.

Note that the technical scope of the present disclosure is not limited to the above-described embodiments, and various modifications can be made to the above-described embodiments without departing from the spirit and gist of the present disclosure.

For example, in the exemplary embodiment described above, a case in which the image display unit 102 moves from the first position P1 to the second position P2 by rotating in the vertical direction Z (rotating within the XZ plane) has been described as an example, but the present disclosure can also be applied to a configuration in which the image display unit 102 moves from the first position P1 to the second position P2 by rotating in the left-right direction Y (rotating within the XY plane).

In addition, in the exemplary embodiment described above, the case where the range of the captured image to be cut out from the imaging range of the imaging unit 104 is gradually changed according to the movement of the image display unit 102 (the rotation angle of the coupling unit 105), that is, the case where the captured image acquired by the image acquisition unit 111 continuously changes has been described as an example. However, the range of the captured image to be cut out from the imaging range of the imaging unit 104 may be changed stepwise.

In addition, in the first exemplary embodiment, the HMD 100 having a configuration in which the position of the imaging unit 104 moves forward before and after the flip-up as illustrated in FIG. 1A has been described as an example, but the present disclosure can also be applied to an HMD having a configuration in which the position of the imaging unit 104 moves backward before and after the flip-up.

In addition, in the exemplary embodiment described above, in order to simplify the description, it is assumed that the orientation of the imaging unit 104 does not change before and after the flip-up, but the present disclosure is not limited thereto.

For example, the present disclosure can be applied even when the orientation of the imaging unit 104 changes before and after the flip-up. For example, the movement amount of the imaging unit 104 in the vertical direction Z may be calculated in consideration of the change amount of the inclination of the imaging unit 104 before and after the flip-up, and the cut-out range in the imaging range may be determined. In this manner, even when the orientation of the imaging unit 104 changes before and after the flip-up, a similar captured image can be acquired before and after the flip-up by correcting the cut-out position in the imaging range.

Furthermore, the specific configuration such as the number, arrangement, shape, and material of the various components that constitute wearable display devices is not limited to the above-mentioned exemplary embodiments, and may be suitably changed.

The wearable display device according to the aspect of the present disclosure may have the following configuration.

The wearable display device according to an aspect of the present disclosure includes a mounting unit, an image display unit configured to display an image, a frame configured to support the image display unit, an imaging unit supported by the frame and configured to image an external scene, a coupling unit configured to couple the frame and the mounting unit such that a position of the image display unit with respect to the mounting unit is changeable in a first direction, and an image acquisition unit configured to acquire an image of an external scene from a portion of an imaging range captured by the imaging unit based on the position of the image display unit with respect to the mounting unit, wherein the image acquisition unit is configured to acquire the image of the external scene from a range on one side in the first direction in the imaging range of the imaging unit when the position of the image display unit with respect to the mounting unit is changed from the one side to another side in the first direction.

In the wearable display device according to one aspect of the present disclosure, the coupling unit may be configured to change the position of the image display unit with respect to the mounting unit in the first direction by rotating about a rotational axis extending in a second direction orthogonal to the first direction.

In the wearable display device according to one aspect of the present disclosure, the coupling unit may include a first linkage portion that is rotatably linked to the mounting unit about a first rotational shaft extending in the second direction, and a second linkage portion that is rotatably linked to the frame about a second rotational shaft extending in the second direction.

In the wearable display device according to one aspect of the present disclosure, the coupling unit may be configured to change the position of the image display unit with respect to the mounting unit between a first position on the one side in the first direction and a second position on the other side in the first direction.

In the wearable display device according to one aspect of the present disclosure, the image acquisition unit may be configured to acquire an image of the external scene from a portion on the other side in the imaging range of the imaging unit when the image display unit is located at the first position, and acquire an image of the external scene from a portion of the one side in the imaging range of the imaging unit when the image display unit is located at the second position.

In the wearable display device according to one aspect of the present disclosure, the detection unit may be further provided for detecting a change amount in the position of the image display unit with respect to the mounting unit, and the image acquisition unit may be configured to acquire the image of the external scene based on the detection result of the detection unit.

What is claimed is:

1. A wearable display device comprising:
   a mounting unit;
   an image display unit that displays an image;
   a frame that supports the image display unit;
   an imaging unit that is supported by the frame and that captures an external scene;
   a coupling unit that contacts the frame and the mounting unit such that a position of the image display unit with respect to the mounting unit is changeable in a first direction; and
   a controller that is configured to acquire, as a first image of the external scene, a range on one side in the first direction in an imaging range of the imaging unit when the position of the image display unit with respect to the mounting unit is changed from the one side to another side in the first direction, wherein
   the coupling unit changes the position of the image display unit with respect to the mounting unit between a first position on the one side in the first direction and a second position on the other side in the first direction, and
   the controller is further configured to:
   acquire, as a second image of the external scene, a range on the other side in the imaging range when the image display unit is located at the first position; and
   acquire, as the first image of the external scene, a range on the one side in the imaging range when the image display unit is located at the second position.

2. The wearable display device according to claim 1, wherein
   the coupling unit changes the position of the image display unit with respect to the mounting unit in the first direction by rotating about a rotational axis extending along a second direction intersecting the first direction.

3. The wearable display device according to claim 2, comprising:
- a first rotational shaft that extends along the second direction; and
- a second rotational shaft that extends along the second direction, wherein the coupling unit includes:
- a first linkage portion that rotates the mounting unit with the first rotational shaft as the rotational axis; and
- a second linkage portion that rotates the frame with the second rotational shaft as the rotational axis.

4. The wearable display device according to claim 1, comprising a detection unit that detects an amount of change in the position of the image display unit with respect to the mounting unit, wherein
- the controller changes a range acquired as the image of the external scene in the imaging range according to a result of the detection by the detection unit, and
- the detection unit comprises a sensor.

* * * * *